US010846397B2

(12) United States Patent
Thompson

(10) Patent No.: US 10,846,397 B2
(45) Date of Patent: Nov. 24, 2020

(54) SEGMENTED WORKSTATION WITH COMMON DESKTOP CONTROL AND MANUAL ACCESS CONTROL

(71) Applicant: Introspective Power, Inc., Broomfield, CO (US)

(72) Inventor: Anthony Scott Thompson, Broomfield, CO (US)

(73) Assignee: Introspective Power Inc., Broomfield, CO (US)

( * ) Notice: Subject to any disclaimer, the term of this patent is extended or adjusted under 35 U.S.C. 154(b) by 164 days.

(21) Appl. No.: 15/717,010

(22) Filed: Sep. 27, 2017

(65) Prior Publication Data

US 2018/0114014 A1    Apr. 26, 2018

Related U.S. Application Data

(60) Provisional application No. 62/411,769, filed on Oct. 24, 2016.

(51) Int. Cl.
| | | |
|---|---|---|
| *G06F 21/53* | (2013.01) | |
| *G06F 21/57* | (2013.01) | |
| *G06F 9/455* | (2018.01) | |
| *G06F 9/451* | (2018.01) | |
| *G06F 9/46* | (2006.01) | |

(52) U.S. Cl.
CPC .............. *G06F 21/53* (2013.01); *G06F 9/452* (2018.02); *G06F 9/45558* (2013.01); *G06F 21/57* (2013.01); *G06F 9/468* (2013.01); *G06F 2009/45587* (2013.01); *G06F 2221/032* (2013.01)

(58) Field of Classification Search
None
See application file for complete search history.

(56) References Cited

U.S. PATENT DOCUMENTS

| | | | | |
|---|---|---|---|---|
| 8,966,578 | B1 * | 2/2015 | Belov | ............... H04L 63/10 709/225 |
| 2005/0114855 | A1 * | 5/2005 | Baumberger | ....... G06F 9/45558 718/1 |
| 2006/0005187 | A1 * | 1/2006 | Neil | ................. G06F 9/455 718/1 |
| 2009/0282485 | A1 * | 11/2009 | Bennett | .............. G06F 21/51 726/24 |

(Continued)

OTHER PUBLICATIONS

Microsoft, "Privileged Access Workstations", Jun. 9, 2016 (Year: 2016).*

*Primary Examiner* — Henry Tsang
(74) *Attorney, Agent, or Firm* — Nixon & Vanderhye PC

(57) ABSTRACT

Sandboxing at a network and workstation level can be used to solve the problem of exposing corporate resources to the "wild west" of the public Internet. The public Internet and the internal corporate network can be separated at a VLAN or Domain level on the internal network. As long as one cannot route to the other either physically or virtually, nether network will be able to communicate with the other. While there are sandboxed solutions, all require the user to switch between environments. Most users find this to be cumbersome and difficult to use. Having a device sandboxed but sharing a common interface provides greater utility and removes some of the tedium around separating the computing environments user interface.

17 Claims, 6 Drawing Sheets

(56) References Cited

U.S. PATENT DOCUMENTS

2014/0282050 A1\* 9/2014 Quinn .................. G06F 3/0481
715/744
2017/0371696 A1\* 12/2017 Prziborowski ...... G06F 9/45558

\* cited by examiner

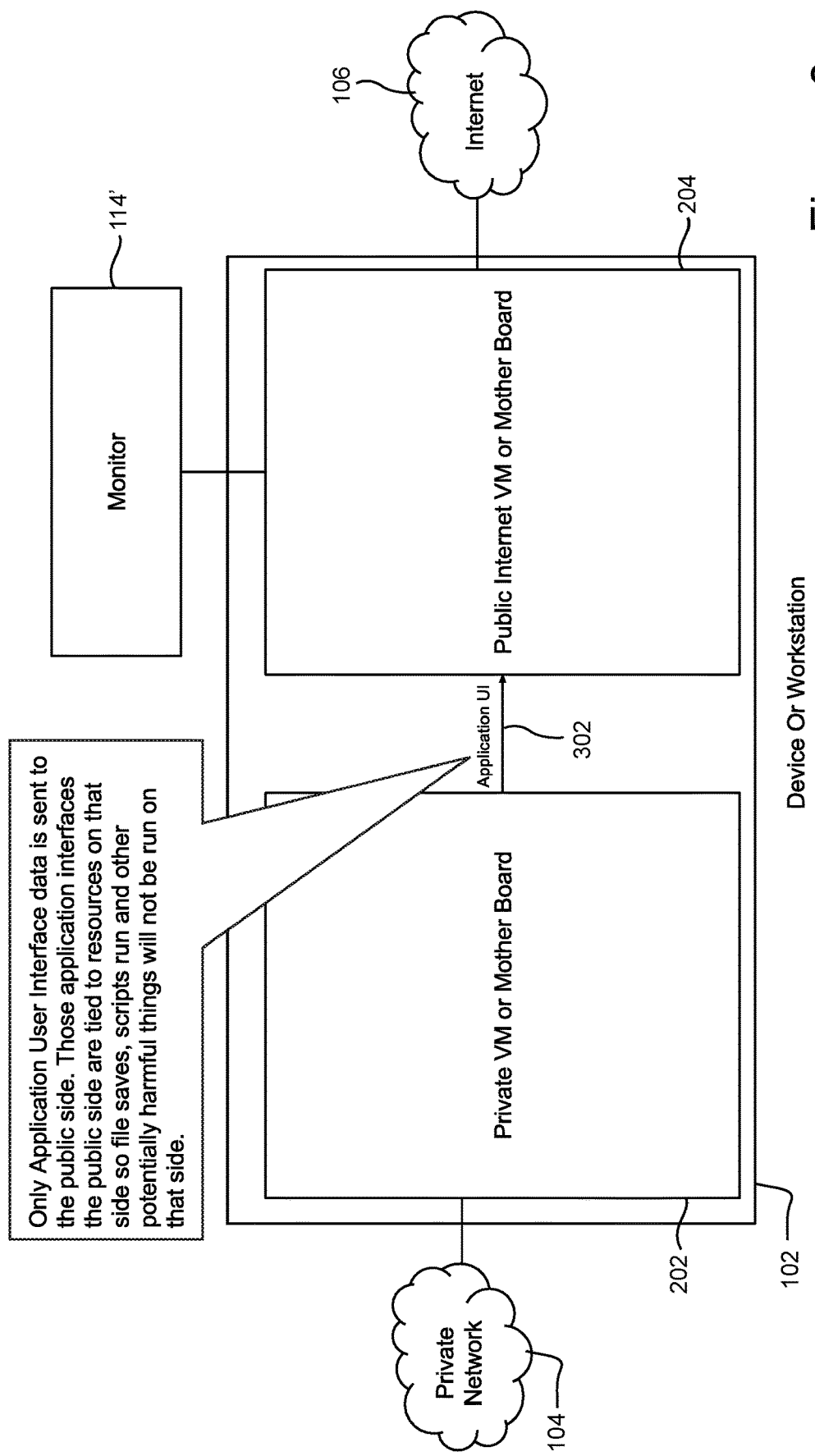

SEGMENTED WORKSTATION WITH COMMON DESKTOP CONTROL AND MANUAL ACCESS CONTROL

CROSS-REFERENCE TO RELATED APPLICATIONS

This application claims benefit of U.S. Provisional Patent Application No. 62/411,769 filed Oct. 24, 2016, incorporated herein by reference.

STATEMENT REGARDING FEDERALLY SPONSORED RESEARCH OR DEVELOPMENT

None.

FIELD

The technology herein relates to cybersecurity, and more particularly to techniques, systems and methods for protecting computer information. Still more particularly, the technology herein relates to user operable and other devices that provide a common user interface for separating secure computing from other computing activities.

BACKGROUND & SUMMARY

The public Internet is now a ubiquitous part of many people's lives. Many daily activities involve online social networking, networked communications and entertainment, and access to other online resources and other public computing resources over the Internet and other public networks.

Devices that can access public network resources are usually also reachable over the public network. Such public access creates cybersecurity risks where attackers can gain access to resources on corporate networks, servers, personal computers, workstations, cellular telephones, tablets and other networked computing devices. Using public network access, cyberintruders can steal information from your devices, install ransomware, spyware or other malicious software such as viruses, or even remotely control your devices.

Cyberattacks cost time, money and productivity. Some authorities estimate that cyberattacks currently cost businesses over $400B annually worldwide. Such costs are likely to skyrocket in the next few years into trillions of dollars annually.

While companies invest in firewalls and virtual private networks to protect against cyberattacks, these measures cannot stop malicious attacks and still allow access to the largest productivity booster the world has ever seen—the public Internet. Most have heard the famous quote from Albert Einstein—"You cannot simultaneously prevent and prepare for war". The same is true of public Internet access. You cannot both restrict and allow access. A measure that allows full access without putting the company's systems at risk is isolation.

One common approach requires users to separate their activities between two different devices. One device is secured and used only for secure applications. It does not have unrestricted access to the public network and is not reachable via the public network. The other device is not secure (or less secure) and can be used for public applications. If the insecure device is attacked, the attacker will be limited to resources on the insecure device and has no access to the secure device.

While this approach is often successful, many users do not like to carry two different devices. Many would prefer to use the same device and user interface for both public and secure applications.

BRIEF DESCRIPTION OF THE DRAWINGS

Non-limiting example features and advantages of various embodiments will be better and more completely understood by referring to the following detailed description of non-limiting embodiments in conjunction with drawings, of which:

FIG. 3 shows an example partitioned access workstation or device public side serving video delivery.

DETAILED DESCRIPTION OF EXAMPLE NON-LIMITING EMBODIMENTS

Figure 1:
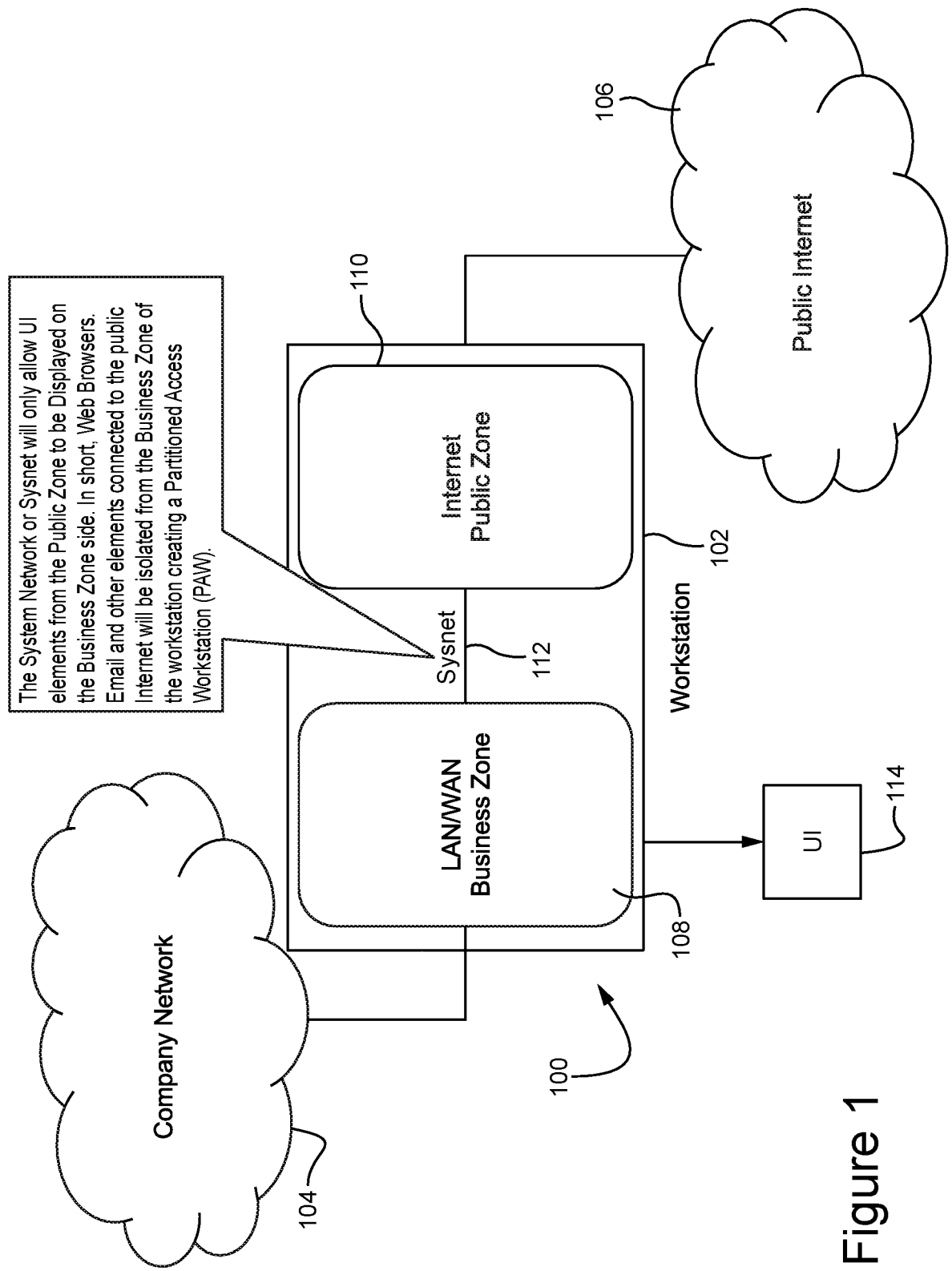
FIG. 1 is a block diagram of a non-limiting example environment and overall system including a company network and a public Internet.

FIG. 1 shows an example non-limiting system 100 including a workstation or other computing appliance 102 connected to both a company or other private network 104 and the Internet or other public network 106. The workstation 102 has two zones: a LAN/WAN business zone 108 and an Internet public zone 110. Software and/or hardware partitioning maintains independence between zones 108, 110 so that computing activities in one zone cannot penetrate into, affect or compromise activities in the other zone.

In one example embodiment, a system network 112 connects the LAN/WAN business zone 108 and the Internet public zone 110 in a secure manner. In particular, the system network ("sysnet") 112 will only show user interface (UI) elements from the public zone 110 to be displayed on the business zone side 108. For example, web browsers, email and other elements connected to the public Internet will be isolated from the business zone 108 of the workstation 102, creating a "partitioned access workstation" (PAW). Separate file, storage, processing and network connection systems can be used for each zone or side 108, 110. As an example, different IP address ranges could for example be used for the public and private zones or sides 108, 110.

As shown in FIG. 1, in one example non-limiting embodiment, "sandboxing" (isolation) at a network and workstation level can be used to solve the problem of exposing corporate resources to the public Internet. The public Internet 106 and the internal corporate network 104 can be separated at a VLAN or Domain level on the internal network 112. As long as one cannot route to the other either physically or virtually, neither network 104, 106 will be able to communicate with the other.

At a workstation level as shown in FIG. 1, we can use separate zones 108, 110 such as virtual machines (VM) to partition access to the workstation 102 and networks 104, 106 they operate on. On one side would be the Business (or first) Zone 108. In this area, full access to corporate information and systems would be allowed. This side would also service a User UI (user interface) 114 such as a display, touch screen, voice command system, or any other humanly-perceivable interface for communicating information to and/or from a human user.

The second zone, or the Internet Zone 110, provides free and full access to the public Internet 106. In one example non-limiting embodiment, the second zone 110 also is running a UI process to facilitate servicing of GUI (graphical user interface) applications but is not necessarily connected to its own separate UI presentation device such as a monitor or other display. Instead, in this non-limiting embodiment, the second zone 110 sends a rendered display or other user interface presentation to the Business Zone 108 but leaves within zone 110 all files, content, executable code, streaming data and other media that might have been downloaded to the Internet Zone 110. Zone 108 in turn sends some or all of the rendered display or other user interface presentation provided by zone 110 to the UI 114 for presentation along with other presentation information zone 108 itself generates. For example, zone 108 in one non-limiting example can generate multiple icon images pertaining to secure applications running within zone 108 for presentation on UI 114, and can receive and pass along (in an integrated manner) additional icon image(s) generated by Internet public zone 10 for presentation by UI 114.

Thus, in the example embodiment, the first and second zones 108, 110 are fully integrated together in the UI 114 from the user perspective even though from a computation and functional standpoint they are entirely separate and independent. Moreover, while the second zone 110 can provide an Internet browser functionality, it is not so limited. To the contrary, any number of applications that provide socket or other connectivity with the Internet or other external network 110 can be provided within the second zone 110. Furthermore, in the example non-limiting embodiment, there is no need for the UI 114 to switch between the first zone 108 and the second zone 110—applications in the first zone and applications in the second zone can be provided on the same display or series of displays and can be running simultaneously, and the security arrangement discussed above can protect the Business zone 108 applications from the second or Internet Zone 110 applications.

Using a Partitioned Access Workstation ("PAW") such as shown in FIG. 1, public and non-public information can be completely segmented and segregated from one another without the limitation of separate UI experiences. To the user, the FIG. 1 system may provide a look and feel of current state of the art with converged Internet and company LAN/WAN. In a PAW such as shown in FIG. 1, ransomware or other malicious software that may infiltrate the public zone 110 is "sandboxed" and kept away from critical business resources accessible only via the private zone 108. Internet access that may be necessary to conduct business but might be blocked by firewall rules can now be removed. In short, this is a proactive instead of a reactive measure. Partitioning access at the workstation level removes the massive shortcomings of trying to firewall at the network edge. Firewalls are of course still possible and supported (for example, it still may be desirable to protect the public zone 110 from cyberattacks such as ransomware, spyware and viruses), but the degree of protection that would be needed to protect valuable private data accessible on or via the business zone 108 and the associated company private network 104 is no longer necessary.

Figure 1A:
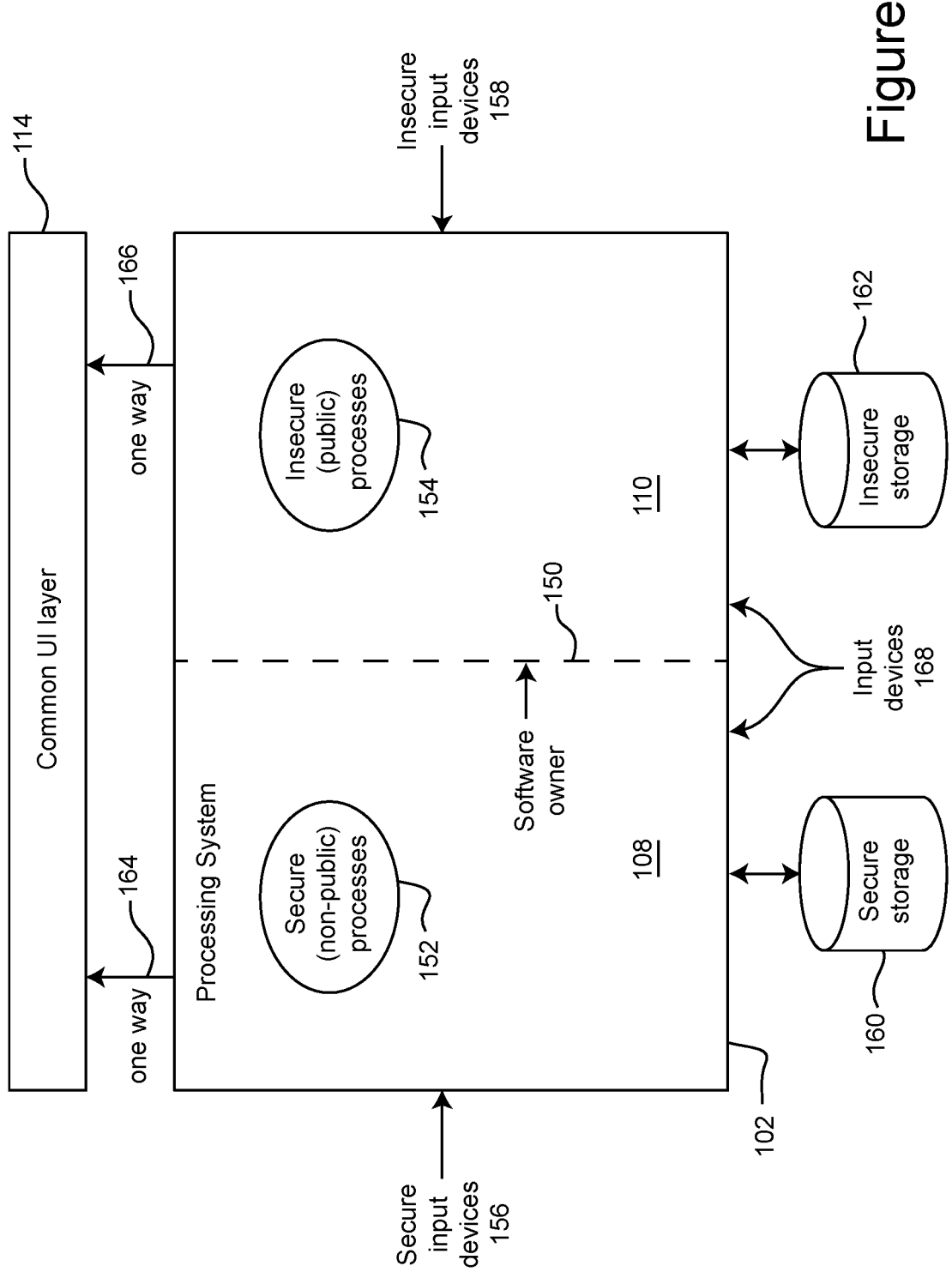
FIG. 1A shows a non-limiting hardware implementation.

FIG. 1A shows an example non-limiting implementation in which a common processing system provides a software and/or hardware based tamper-resistant barrier 150 between secure or private processes 152 executing within the business zone 108 and insecure and/or public processes 154 executing within the public zone 110. Secure or private processes 152 need not be "secret" or "confidential" (although they could be)—they are executed within business zone 108 because it is desired that they not be compromised by or otherwise accessible by any process 152 executing within the public zone 110. Similarly, processes 110 executing within the public zone 110 could involve some degree of confidentiality and/or security while still requiring access to or by the public Internet 106.

As shown in FIG. 1A, at least some secure input devices (including networks) 156 couple only to the secure processes 152, and at least some insecure input devices (including networks) 158 couple only to the insecure processes 154. Separate secure and insecure storage and file systems 160, 162 (which can be isolated from one another using physical security, encryption or other software security, or both) are respectively coupled to the secure and insecure processes 152, 154. One-way data links 164, 166 provide outputs from each of secure processes 152 and insecure processes 156, respectively, to a common user interface layer 114 for display or other output to a user, machine or other entity.

Other input devices 168 may provide inputs to both secure processes 152 and insecure processes 154 without compromising the partitioning between zones 108, 110. For example, a keyboard, touchscreen, mouse or other pointing device, microphone, and/or other input devices 168 can provide outputs to both secure processes 152 and insecure processes 154 so the user can use the same input devices to control both the secure processes and the insecure processes. Such input devices 168 for example could be connected via one-way data links with hardware or software protection to prevent the insecure processes 154 from mimicking, to the secure processes 152, inputs provided by actual user input devices.

Figure 2:
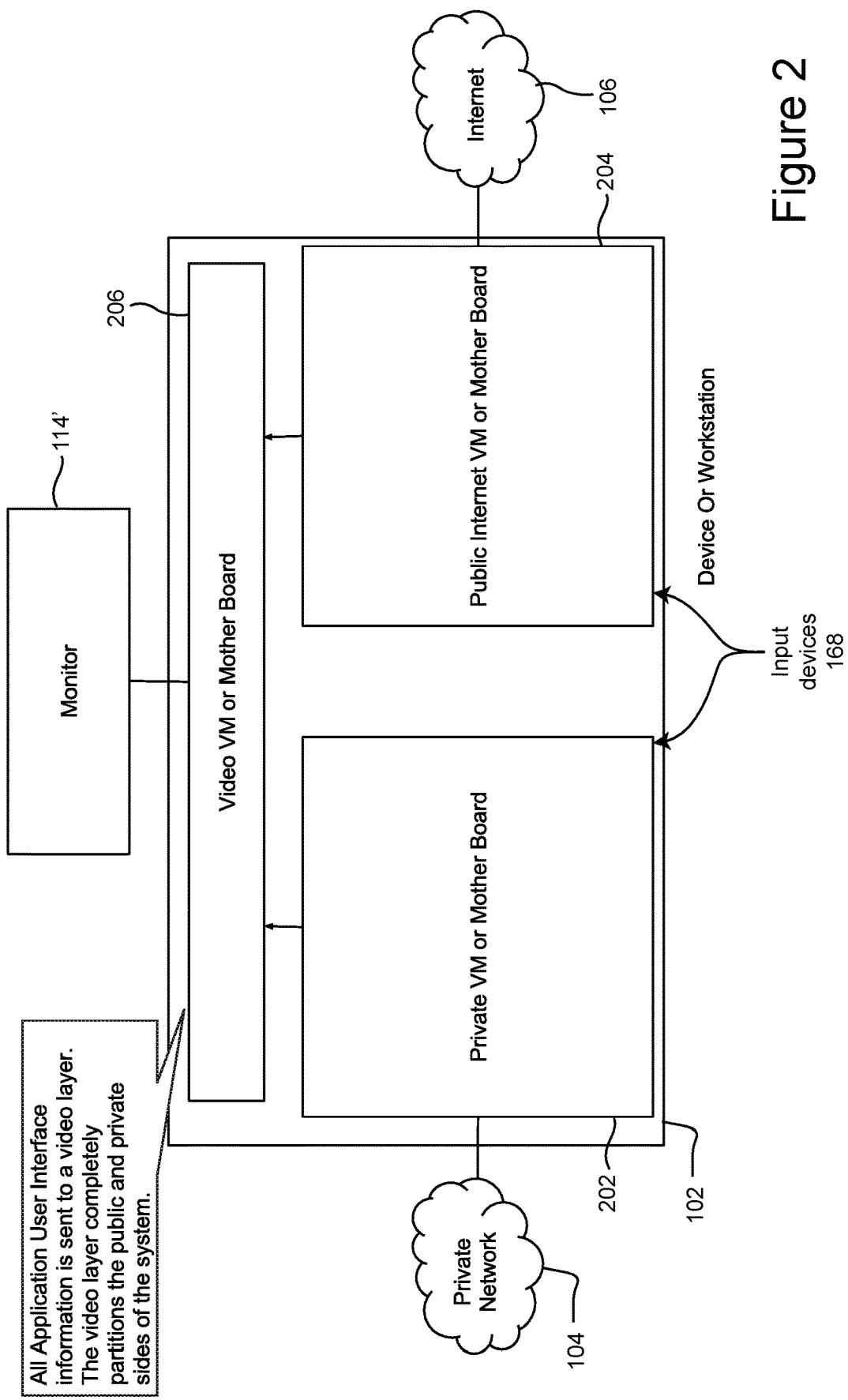
FIG. 2 shows an example partitioned access workstation or device video layer.

FIG. 2 shows an example non-limiting implementation including hardware and/or software based separation/isolation within a single device. In this example, a device or workstation 102 includes a private virtual machine or mother board 202, a public Internet virtual machine or mother board 204, and a shared video virtual machine or mother board 206. The term "mother board" as used herein is intended not to be limited to physically separate printed circuit boards, and can describe components on the same printed circuit board or other circuit carrying structure isolated from one another using separate pathways or the like. Similarly, different virtual machines may be implemented on a common processor using software isolation therebetween such as separate operating systems, emulators, other execution environments; or they may be implemented using software running on different physical processors.

As one possible implementation example, the private virtual machine or motherboard 202 could be implemented using a secure processor packaged in a tamper-resistant housing that is physically isolated from a second processor used to implement the public Internet virtual machine or motherboard 204. In other implementations, the same processor or processor arrangement (which could for example comprise a multi-core processing architecture) could run separate virtual machine software applications such as a first virtual machine, emulator or other execution environment for the private virtual machine and a second virtual machine, emulator or other execution for the public Internet virtual machine.

In the FIG. 2 implementation, the private virtual machine or mother board 202 is internally connected to a private network 104, and the public Internet virtual machine or mother board 204 is internally connected to the Internet or other public network 106. There is no interconnection in this example between the Internet 106 and the private virtual machine or mother board 202. This means that any and all computing performed by the private virtual machine or mother board 202 cannot be accessed, affected, compromised or otherwise influenced by the Internet 106 or computing being performed by the public Internet virtual machine or mother board 204. Any spyware, ransomware, hacking, cyberattacks or other problematic behavior that may present on the public Internet virtual machine or mother board 204 will not be able to affect in any way the computing the private virtual machine or mother board 202 is performing. Rather, the private virtual machine or motherboard 202 is completely isolated and protected, by physical security and/or strong software or other virtual security, from the public computing side of the workstation or device 204.

Meanwhile, both the private virtual machine or motherboard 202 and the public internet virtual machine or mother board 204 are each able to communicate with a user via a common video virtual machine or motherboard 206. As above, the video virtual machine or motherboard 206 could be physically separate hardware, or it could be shared hardware and/or software that has certain bidirectionality disabled or not present so that information from the private side 202 cannot cross over to the public side 204 or vice versa. In the example shown, all application user interface information is sent to this common video (UI) layer 206 that completely partitions the public and private sides 202, 204 of the system. In one non-limiting example, such partitioning allows both private side 202 application output and public side 204 application output to be displayed on a common monitor or display 114'. Similarly, other types of output such as audio, control, streaming video or the like can be supplied to common devices for perception by the user while still completely partitioning the public and private information. User input devices 168 such as keyboards, pointing devices, microphones, biometric scanners, writing tablets, etc., can provide inputs to both the public and private sides of the workstation 102 without providing any path by which public side computing data or processes can penetrate to the private side and vice versa. By using a shared UI 114, the user will generally speaking not even need to be aware that some of her applications are public and some are private. The partitioning of the workstation 102 takes care of securing private computing processes 152 and data from encroachment by anything going on in the public side 154 or on the public network 106, and the user can see both computing results on a common display 114'—either in separate windows or combined or mashed up in a common display.

While FIG. 2 shows that workstation 102 includes both private virtual machine or motherboard 202 and public Internet VM or motherboard 204, such private virtual machines or motherboards 202, 204 may but need not be housed within the same housing or even co-located. For example, private virtual machine or motherboard 202 may be located in a different physical location from public Internet virtual machine or motherboard 204. In one example non-limiting implementation, one or both of system portions 202, 204 could be located in the cloud, in a network gateway device, or in any other separate device arrangements, and coupled to video virtual machine or motherboard 206 by a data link. One example non-limiting embodiment could locate execution environments 108, 110 is separately and locate the common user interface layer 114 in a still additional location. Thus, the user interface 114 could be located on a terminal or similar display device with the user, with both environments 108, 110 communicating wirelessly or via wired networking or both with the user device.

As one example, workstation 202 could communicate remotely with private virtual machine or motherboard 202 via a conventional terminal protocol data link such as VT100, IBM 3270, IBM 5250, xterm, or any other conventional or proprietary command line or other data interface. Such terminal data communications can be protected using data security techniques such as disclosed in U.S. Pat. No. 9,584,488 entitled "Data encryption cipher using rotating ports" and/or U.S. Pat. No. 9,584,313 entitled "Streaming one time pad cipher using rotating ports for data encryption", incorporated herein by reference. The use of a terminal protocol interface provide a high degree of functional separation providing added security against infiltration of private virtual machine or motherboard 202 by agents that may reside on public internet virtual machine or motherboard 204. The physical separation of private virtual machine or motherboard 202 from public internet virtual machine or motherboard 204 also provides added security and allows the system to be implemented for example in contexts in which the user carries device 201 providing a single processor and/or execution environment (namely public internet virtual machine or motherboard 204). In such embodiments, the physically-remote private virtual machine or motherboard 202 can be located anywhere (e.g., in a hardened or other secure location) and can communicate via a restricted, closely-monitored, secured virtual private network with the video virtual machine or motherboard 206. Communication between the user device and the remote private virtual machine or motherboard 202 can be wired, wireless or both.

In still another example non-limiting embodiment, the device local to the user may comprise the private virtual machine or motherboard 202 and the video virtual machine or motherboard 206, and the public internet virtual machine or motherboard 204 can be located in a remote location such as in the cloud, in a file server room, in another user device, etc. In this way, the user device is highly secure and cannot be compromised by agents executing on the remote public internet virtual machine or motherboard 204 connected to the Internet 106.

Still another example non-limiting implementation of the FIG. 2 system could be a personal computer including two separate hardware processors and associated execution environments. Both processors could be disposed within the same housing, or one of the processors could be for example connected to the personal computer via a USB or other high speed data link. Each of the two hardware processors and associated execution environments is connected to a respective network adapter, with one network adapter being connected to private network 104 and the other network adapter being connected to the Internet 106. Both hardware processors and associated execution environments are empowered to write data into a common display adapter that uses hardware circuitry to prevent one processor from invading the resources of the other processor via the display adapter. The display adapter thus completely partitions the public and private sides of the system.

Figure 2A:
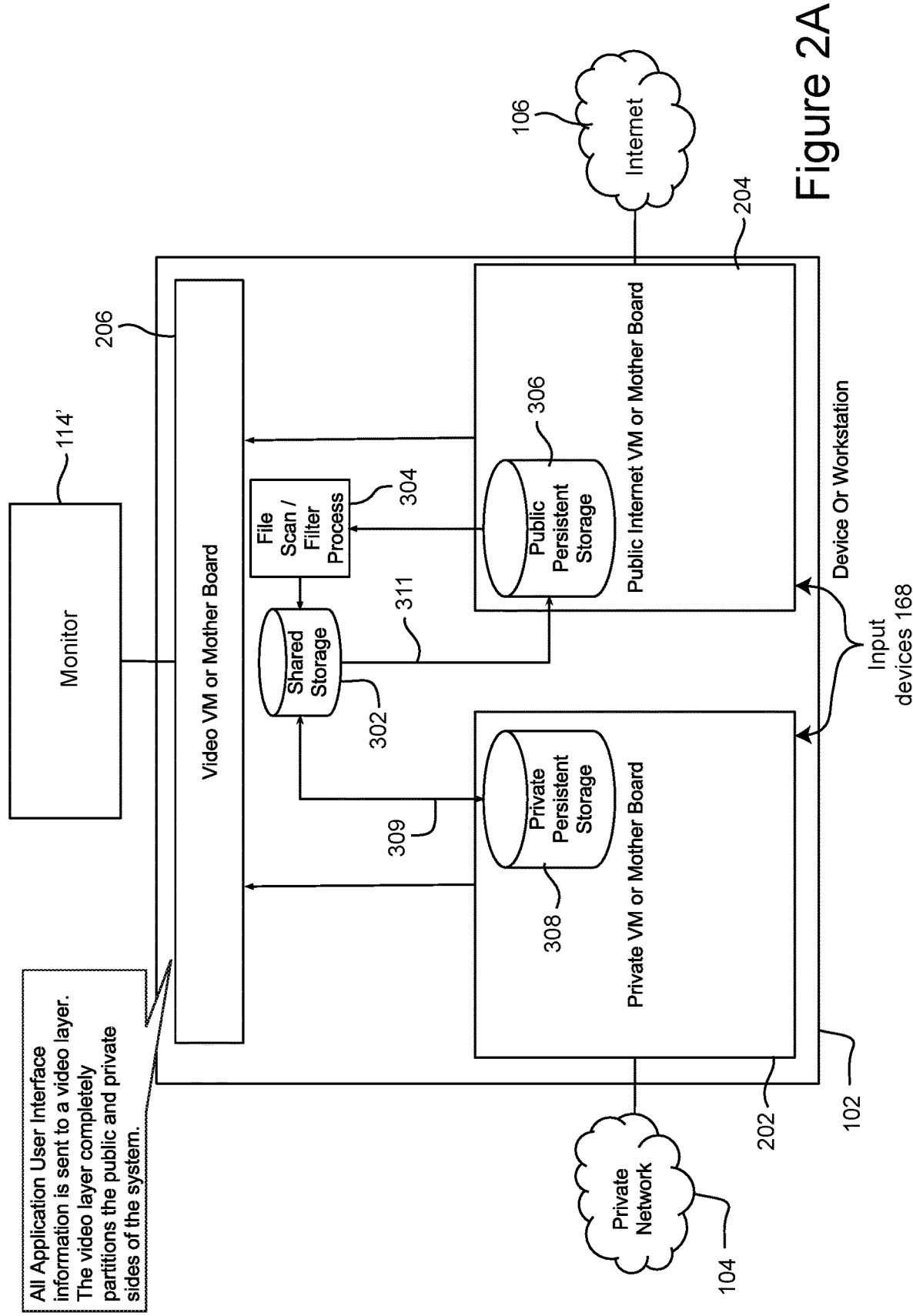
FIG. 2A shows an example partitioned access workstation or device including a video layer with shared, controlled storage.

FIG. 2A shows a further, more detailed implementation of the FIG. 2 embodiment including shared controlled storage. In the example shown, each of the public and private zones includes its own dedicated persistent storage. Thus, the private zone 202 includes private persistent storage 308, and the public zone 204 includes public persistent storage 306. Such storage 306, 308 may be any kind(s) of persistent storage such as magnetic disk, flash or other semiconductor memory, dynamic or static random access memory, programmable gate arrays, or any other type of persistent memory.

In the example shown, the private persistent storage 308 is coupled to a shared storage 302 via a link 309, and the public persistent storage 306 is coupled to the same shared storage 302 via a link 311 and a file scan/filter process 304. The link 309 between shared storage 302 and persistent private storage 308 is bidirectional in one embodiment, and the link 311 between the shared storage and the public persistent storage 306 is unidirectional (read-only from the standpoint of the public persistent storage reading from the shared storage 311).

The file scan/filter process 304 (which may be executed by a processor and/or implemented in hardware) protects shared storage 302 from malicious or harmful contents of public persistent storage 306 being written to it from the public persistent storage. File scan/filter process 304 can comprise a combination of filtering and/or scanning to e.g., provide a virus scanning process that ensures that data is not first stored and then scanned (a common issue with many virus scanners). File scan/filter process 304 can include manual filtering as well as automatic filtering.

As an example, an attachment in an email originating over the public network 106 may eventually need to be stored on the private (e.g., enterprise) side 202 of the partition but is not stored there directly. Rather, the attachment is first stored in the public persistent storage 306. From the private side 202, copies of items will simply flow through the shared storage 302 over unidirectional link 311 to the public side 204. From the public side 204, files will be scrutinized either manually or in an automated fashion by block 304 to ensure things like executables and scripts cannot be passed to the private or enterprise computing partition 292, before such files are stored in shared storage 302 and made accessible to private persistent storage 308.

FIG. 3 shows an example non-limiting embodiment providing a unidirectional UI linkage 302 from the private side 202 to the public side 204. In this example, only application UI data is sent from the private side 202 to the public side 204. The one-way UI link 302 is used by the private side 202 to deliver user interface presentation information to the public side 204, and the public side is responsible for displaying or otherwise presenting the delivered information on the display 114' or other presentation device. Those application interfaces on the public side 204 are tied to resources on that side, so file saves, scripts run and other potentially harmful behavior will not be run the private side 202.

Figure 4:
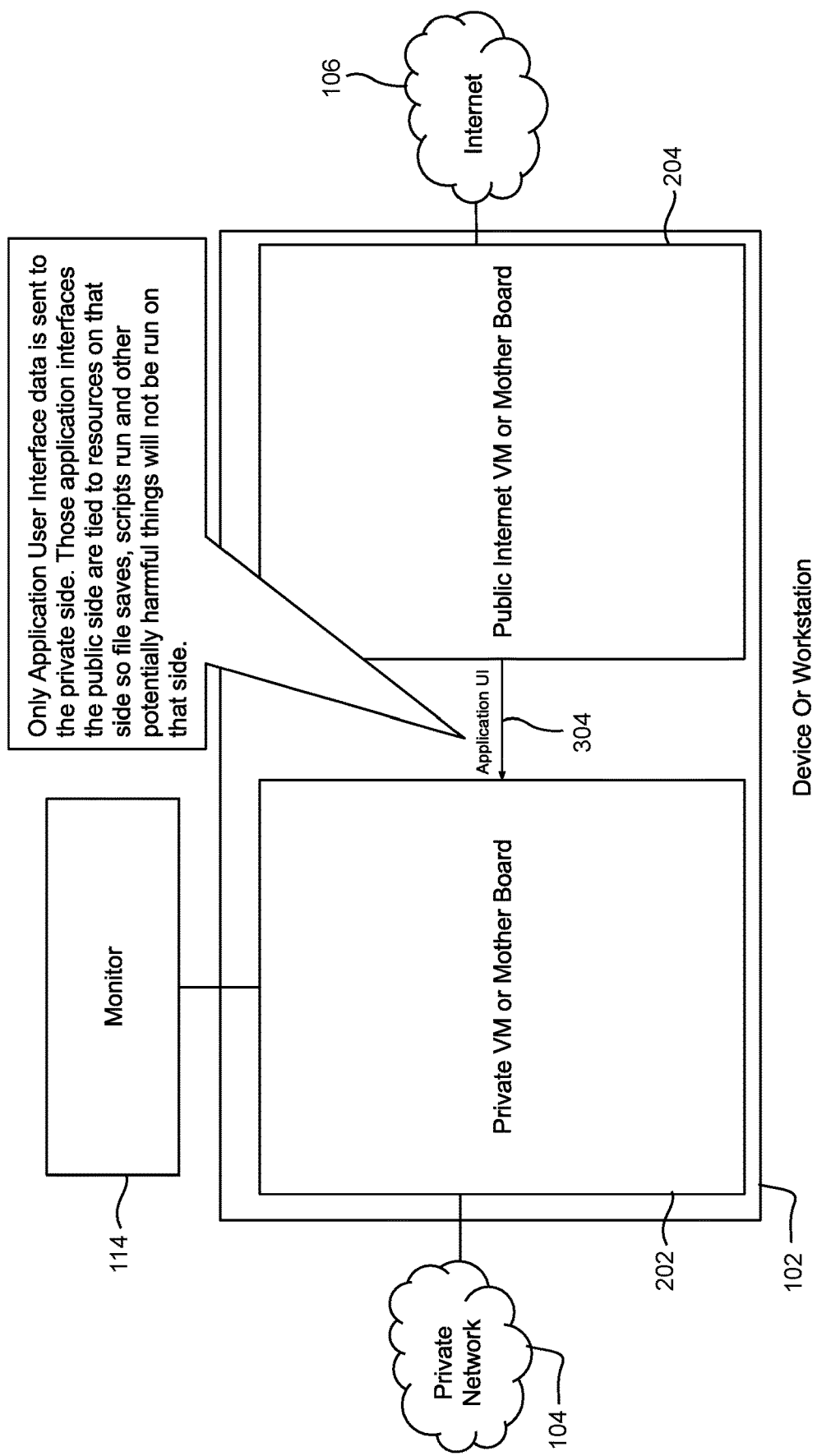
FIG. 4 shows an example partitioned access workstation or device private side serving video delivery.

FIG. 4 shows a further embodiment in which a unidirectional UI linkage 304 is provided from the public side 204 to the private side 202. In this case, only application user interface data is sent to the private side 204 through the one-way link 304. Those application interfaces on the public side 204 are tied to resources on that side to file saves, scripts run and other potentially harmful behavior will not be run on the private side 202.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A segmented computing appliance comprising:
    a first computing machine coupled to a public network and providing first user presentation information;
    a second computing machine providing second user presentation information;
    a common user interface layer that is separate from the first computing machine and the second computing machine, the common user interface layer receiving presentation information from the first computing machine and the second computing machine, and presenting the first user presentation information and the second user presentation information on a common display;
    a storage shared between the first computing machine and the second computing machine, the shared storage storing a candidate file; and
    an access control processor operatively coupled to the shared storage, the access control processor providing access control and validation of the candidate stored file for sharing between the first and second computing machines, the access control processor being configured to provide manual filtering by one or more person to provide control over access of the candidate stored file by at least one of the first and second computing machines,
    wherein the first and second computing machines are partitioned from one another to thereby prevent malicious items existing on the first computing machine from reaching the second computing machine.

2. The appliance of claim 1 wherein the second computing resource is connected to a private network.

3. The appliance of claim 1 wherein the first and second computing resources are co-located.

4. The appliance of claim 1 wherein the first and second computing resources are remote from one another.

5. The appliance of claim 1 wherein communication with at least one of the first and second computing resources is via terminal protocol.

6. The appliance of claim 1 wherein at least one of the first and second computing resources are located in the cloud.

7. The appliance of claim 1 wherein at least one of the first and second computing resources is disposed in a network gateway device.

8. The appliance of claim 1 further comprising a one-way link between the first and second computing resources that is used exclusively to communicate user interface information.

9. The segmented computing appliance of claim 1 wherein the first computing machine comprises a first virtual machine and the second computing machine comprises a second virtual machine.

10. The segmented computing appliance of claim 1 wherein the first computing machine comprises first hardware including a first processor, and the second computing machine comprises second hardware including a second processor.

11. The segmented computing appliance of claim 1 further including a facility for requiring approval to access data by at least one of the first computing machine and the second computing machine.

12. The segmented computing appliance of claim 11 wherein the facility for requiring approval to access data requires approval by at least one approver.

13. A partitioned computer comprising:
    a first computing environment coupled to a public network and providing first user presentation information;

a second computing environment providing second user presentation information; and
a common user interface layer that is separate from the first computing environment and the second computing environment, the common user interface layer receiving presentation information from the first computing environment and the second computing environment, and presenting the first user presentation information and the second user presentation information on a common display,
a storage shared between the first computing machine and the second computing machine, the shared storage storing a candidate file; and
an access control processor operatively coupled to the shared storage, the access control processor providing access control and validation of the candidate stored file for sharing between the first and second computing machines, the access control processor being configured to provide manual filtering by one or more person to provide control over access of the candidate stored file by at least one of the first and second computing machines,
wherein the first and second computing environments execute on separate independent hardware that prevents cyberattacks against the first computing environment from reaching the second computing environment while allowing both first and second computing environments to share a common user interface layer provided by additional hardware that is separate and independent from hardware supporting at least one of the first and second computing environments.

14. A partitioned computer comprising:
a first computing environment coupled to a public network and providing first user presentation information;
a second computing environment providing second user presentation information; and
a common user interface layer that is separate from the first computing environment and the second computing environment, the common user interface layer receiving presentation information from the first computing environment and the second computing environment, and presenting the first user presentation information and the second user presentation information on a common display,
a storage shared between the first computing machine and the second computing machine, the shared storage storing a candidate file; and
an access control processor operatively coupled to the shared storage, the access control processor providing access control and validation of the candidate stored file for sharing between the first and second computing machines, the access control processor being configured to provide manual filtering by one or more person to provide control over access of the candidate stored file by at least one of the first and second computing machines,
wherein the first and second computing environments each include respective storage, and the partitioned computer further includes shared storage that is directly coupled to the second computing environment and protectively coupled to the first computing environment.

15. The partitioned computer of claim 14 further including a unidirectional data link and the access control processor is configured to protectively couple the first computing environment to the shared storage.

16. The partitioned computer of claim 15 wherein the access control processor comprises a manual selector.

17. The partitioned computer of claim 15 wherein the access control processor comprises an automatic selector.

* * * * *